United States Patent
Holl et al.

(10) Patent No.: US 11,773,745 B2
(45) Date of Patent: Oct. 3, 2023

(54) PRESSURE AND TEMPERATURE SENSORS AND METHODS OF CONTROLLING ICE ACCRETION ON PRESSURE AND TEMPERATURE SENSORS

(71) Applicant: Rosemount Aerospace Inc., Burnsville, MN (US)

(72) Inventors: Andrew Holl, Lakeville, MN (US); Scott Wigen, Eagan, MN (US); Scott D. Isebrand, Minneapolis, MN (US); Robert Edward Sable, Lakeville, MN (US); Brian Boyd, Burnsville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 540 days.

(21) Appl. No.: 16/805,468

(22) Filed: Feb. 28, 2020

(65) Prior Publication Data
US 2021/0270146 A1 Sep. 2, 2021

(51) Int. Cl.
*F01D 21/00* (2006.01)
*F01D 25/02* (2006.01)
(Continued)

(52) U.S. Cl.
CPC .......... *F01D 21/003* (2013.01); *F01D 25/02* (2013.01); *G01K 1/08* (2013.01); *G01K 1/20* (2013.01); *G01K 13/02* (2013.01); *B33Y 80/00* (2014.12); *F05D 2220/323* (2013.01); *F05D 2220/3217* (2013.01)

(58) Field of Classification Search
None
See application file for complete search history.

(56) References Cited

U.S. PATENT DOCUMENTS

| 5,731,507 A | 3/1998 | Hagen et al. |
| 5,752,674 A | 5/1998 | Mears et al. |

(Continued)

FOREIGN PATENT DOCUMENTS

| EP | 2863195 B1 | 9/2016 |
| EP | 2853872 B1 | 5/2017 |
| EP | 3581939 A1 | 12/2019 |

OTHER PUBLICATIONS

European Search Report for Application No. 21157712.7, dated Jul. 21, 2021, 47 pages.
(Continued)

*Primary Examiner* — Juan G Flores
(74) *Attorney, Agent, or Firm* — CANTOR COLBURN LLP

(57) ABSTRACT

A sensor includes an airfoil body, a heater element, and a temperature probe. The airfoil body defines a sensor axis and having a leading edge, a trailing edge, and an ice accretion feature. The heater element extends axially through the airfoil body between the leading edge and the trailing edge of the airfoil body. The temperature probe extends axially through the airfoil body between the heater element and the trailing edge of the airfoil body. The heater element is axially overlapped by the ice accretion feature to accrete ice chordwise forward of a tip surface aperture. Gas turbine engines, methods of making sensors, and methods of accreting ice on sensors are also described.

17 Claims, 12 Drawing Sheets

(51) Int. Cl.
*G01K 1/08* (2021.01)
*G01K 1/20* (2006.01)
*G01K 13/02* (2021.01)
*B33Y 80/00* (2015.01)

(56) References Cited

U.S. PATENT DOCUMENTS

| | | | |
|---|---|---|---|
| 9,429,482 | B2 | 8/2016 | Isebrand |
| 9,488,534 | B2 | 11/2016 | Wigen et al. |
| 9,631,985 | B2 * | 4/2017 | Herman ............... G01K 13/028 |
| 9,664,542 | B2 | 5/2017 | Gordon et al. |
| 9,772,345 | B2 | 9/2017 | Golly et al. |
| 10,371,000 | B1 | 8/2019 | Graham |
| 10,436,649 | B2 | 10/2019 | Anderson et al. |
| 10,605,675 | B2 | 3/2020 | Parsons et al. |
| 2004/0237641 | A1 | 12/2004 | Hanson et al. |
| 2005/0232331 | A1 | 10/2005 | Severson |
| 2007/0220984 | A1 * | 9/2007 | Slagle .................. G01P 5/16 |
| | | | 374/E13.006 |
| 2013/0022076 | A1 | 1/2013 | Dijon et al. |
| 2013/0163636 | A1 | 6/2013 | Parsons |
| 2015/0063414 | A1 | 3/2015 | Wigen et al. |
| 2015/0093244 | A1 | 4/2015 | Wigen |
| 2015/0103863 | A1 * | 4/2015 | Herman ............... G01K 13/028 |
| | | | 374/138 |
| 2015/0110154 | A1 | 4/2015 | Gmach et al. |
| 2016/0348531 | A1 | 12/2016 | Rice et al. |
| 2018/0143082 | A1 | 5/2018 | Anderson et al. |
| 2018/0372556 | A1 | 12/2018 | Parsons et al. |
| 2018/0372559 | A1 | 12/2018 | Parsons et al. |
| 2019/0301949 | A1 | 10/2019 | Gordon et al. |
| 2020/0189754 | A1 | 6/2020 | Jones et al. |
| 2021/0270144 | A1 | 9/2021 | Holl et al. |
| 2021/0270149 | A1 | 9/2021 | Holl et al. |

OTHER PUBLICATIONS

European Search Report for Application No. 21158728.2, dated Jul. 22, 2021, 43 pages.
European Search Report; European Application No. 21159756.2; dated Jul. 13, 2021; 9 pages.
European Office Action for Application No. 21158728.2, dated Jul. 28, 2023, 5 pages.

* cited by examiner

PRESSURE AND TEMPERATURE SENSORS AND METHODS OF CONTROLLING ICE ACCRETION ON PRESSURE AND TEMPERATURE SENSORS

BACKGROUND

The present disclosure is generally related to pressure and temperature measurement, and more particularly to controlling ice accretion on sensors used to measure pressure and temperature.

Gas turbine engines, such as carried by aircraft, commonly employ sensors. The sensors are generally employed to monitor parameters that can influence performance of the gas turbine engine. For example, temperature sensors may be employed to measure temperature of air entering the compressor section of the gas turbine engine. Pressure sensors may alternatively (or additionally) be employed to measure pressure of airstream entering the compressor section of the gas turbine engine. Such sensors typically employ a probe, which protrudes into the airstream entering the compressor section to monitor engine operating condition and/or to control operation of the gas turbine engine.

In some operating environments, such as during flight in icing conditions, gas turbine engines sensors can be exposed to ice and/or super-cooled moisture. The ice and/or super-cooled moisture in such environments can interrupt operation of some sensors, such as when ingested within the sensor or permitted to accrete over the temperature probe, potentially introducing anomalies into the sensor temperature and/or pressure measurements. And while the probe itself can be heated as a countermeasure to ice accretion, heating the probe can also introduce error into the sensor measurements.

Such systems and methods have generally been acceptable for their intended purpose. However, there remains a need for improved pressure and temperature sensors, gas turbine engines, methods of making sensors, and methods of controlling ice accretion on pressure and temperature sensors.

BRIEF DESCRIPTION

A sensor is provided. The sensor includes an airfoil body, a heater element, and a temperature probe. The airfoil body defines a sensor axis and having a leading edge, a trailing edge, and an ice accretion feature. The heater element extends axially through the airfoil body between the leading edge and the trailing edge of the airfoil body. The temperature probe extends axially through the airfoil body between the heater element and the trailing edge of the airfoil body. The heater element is axially overlapped by the ice accretion feature to accrete ice chordwise forward of a tip surface aperture.

In addition to one or more of the features described above, or as an alternative, further examples of the sensor may include that the ice accretion feature extends from the leading edge of the airfoil body to an ice accretion feature terminus that is located chordwise between the heater element and the temperature probe.

In addition to one or more of the features described above, or as an alternative, further examples of the sensor may include that the airfoil body has a first face and a second face defining therebetween an airfoil width, and that the ice accretion feature has an ice accretion feature width that is smaller than the airfoil width.

In addition to one or more of the features described above, or as an alternative, further examples of the sensor may include that the ice accretion feature includes a fin body extending from the leading edge to an ice accretion feature terminus that is located chordwise between the heater element and the temperature probe.

In addition to one or more of the features described above, or as an alternative, further examples of the sensor may include that the airfoil body has a first face and a second face defining therebetween an airfoil width, and that the ice accretion feature has an ice accretion feature width that is greater than the airfoil width.

In addition to one or more of the features described above, or as an alternative, further examples of the sensor may include that the airfoil body has a spherical body extending from the leading edge to an ice accretion feature terminus that is located chordwise between the heater element and the temperature probe.

In addition to one or more of the features described above, or as an alternative, further examples of the sensor may include that the sensor is a P2T2 sensor or a P25T25 sensor fixed to a gas turbine engine.

In addition to one or more of the features described above, or as an alternative, further examples of the sensor may include that the airfoil body defines therethrough an insulating cavity extending axially through the airfoil body between the temperature probe and the heater element.

In addition to one or more of the features described above, or as an alternative, further examples of the sensor may include that the airfoil body has a first face defining a first face outlet vent, the first face outlet vent in fluid communication with the insulating cavity.

In addition to one or more of the features described above, or as an alternative, further examples of the sensor may include that the airfoil body has a second face defining a second face outlet vent, the second face outlet vent in fluid communication with the insulating cavity and in registration with the first face outlet vent.

In addition to one or more of the features described above, or as an alternative, further examples of the sensor may include that the airfoil body has a tip surface extending from the ice accretion feature to the trailing edge of the airfoil body, the tip surface defining an insulating cavity inlet that is located chordwise between the ice accretion feature and the temperature probe.

In addition to one or more of the features described above, or as an alternative, further examples of the sensor may include that the airfoil body has a first face with a first face outlet vent and defines therethrough an insulating cavity, the insulating cavity fluidly coupling the insulating cavity inlet with the first face outlet vent.

In addition to one or more of the features described above, or as an alternative, further examples of the sensor may include that the airfoil body has a second face with a second face outlet vent, and that the insulating cavity inlet is fluidly coupled to the second face outlet vent by the insulating cavity.

In addition to one or more of the features described above, or as an alternative, further examples of the sensor may include that the airfoil body defines a temperature sense chamber that is located chordwise between the trailing edge of the airfoil body and the heater element, and that the temperature probe extends at least partially through the temperature sense chamber.

In addition to one or more of the features described above, or as an alternative, further examples of the sensor may include that the airfoil body has a first face extending between the leading edge and the trailing edge of the airfoil body, the first face defining therethrough a first face aperture, and that the temperature sense chamber is fluidly coupled to an environment external to the airfoil body by the first face aperture.

In addition to one or more of the features described above, or as an alternative, further examples of the sensor may include that the airfoil body has a second face extending between the leading edge and the trailing edge of the airfoil body, the second face defining therethrough a second face aperture, and that the second face aperture is in registration with the first face aperture.

In addition to one or more of the features described above, or as an alternative, further examples of the sensor may include that the temperature sense chamber is fluidly coupled to the environment external to the airfoil body by the second face aperture fluidly.

A method of making a sensor is additionally provided. The method includes forming an airfoil body defining a sensor axis and having a leading edge, a trailing edge, and an ice accretion feature using an additive manufacturing technique. It is contemplated that forming the airfoil with the additive manufacturing technique include defining a heater element seat extending axially through the airfoil body between the leading edge and the trailing edge of the airfoil body, and defining a temperature probe seat extending axially through the airfoil body between the heater element seat and the trailing edge of the airfoil body such that the ice accretion feature axially overlaps the heater element seat. It is also contemplated that the method include positioning a heater element within the heater element seat and positioning a temperature probe within the temperature probe seat.

A method of controlling ice accretion is further provided. The method includes, at a sensor as described above, heating a heated portion of the airfoil body with the heater element and thermally separating the temperature probe from the heater element by flowing air traversing the ice accretion feature through the airfoil body. The ice accretion feature is heated to a temperature than is greater than that of the temperature probe and ice accreted at location chordwise forward of a tip surface aperture.

Technical effects of the present disclosure include the capability to divide a monolithic airfoil body into a heated portion and an unheated portion to both limit ice accretion on the heated portion while measuring ambient air temperature at the unheated portion of the airfoil body. It is also contemplated that, in accordance with certain examples, sensors described herein include the capability to limit (or eliminate entirely) interference between heat generated by the heater element and the temperature measurements provided by the sensor. Further examples of sensor described herein include the capability to preferentially accrete ice at locations where the ice can periodically be shed without interfering with pressure and temperature sensing by the sensor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
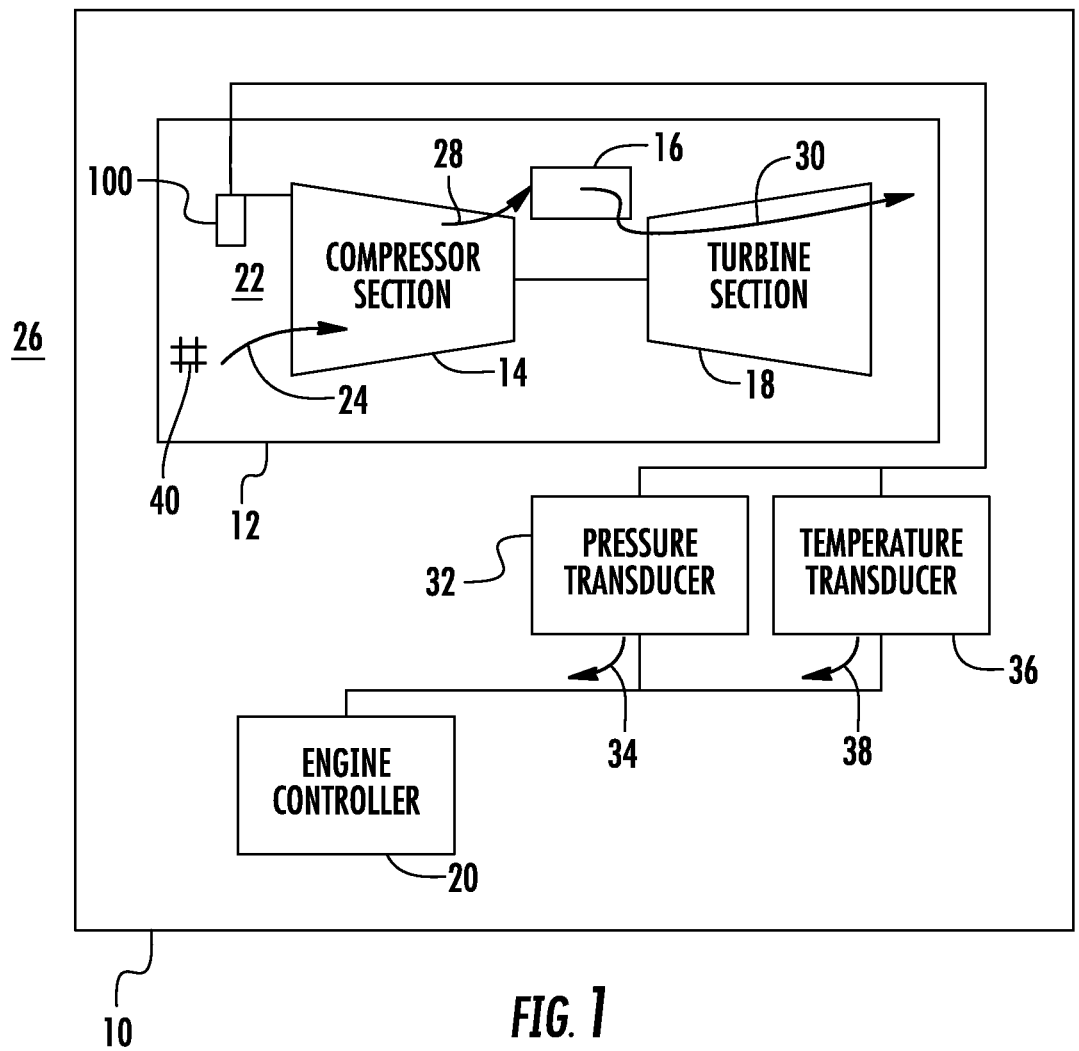
FIG. 1 is a schematic view of a pressure and temperature sensor constructed in accordance with the present disclosure, showing the sensor supported within the compressor inlet of the gas turbine engine.

Reference will now be made to the drawings wherein like reference numerals identify similar structural features or aspects of the subject disclosure. For purposes of explanation and illustration, and not limitation, a partial view of a sensor 100 in accordance with the disclosure is shown in FIG. 1 and is designated generally by reference character 100. Other embodiments of sensors, gas turbine engines, methods of making sensors, and methods of controlling ice accretion on sensors, and methods of making sensors and sensor assemblies are provided in FIGS. 2-19, as will be described. The sensors and related methods described herein can be used for measuring pressure and temperature of air in sensors exposed to icing conditions, such as in P2T2 probes on aircraft, though the present disclosure is not limited to P2T2 probes or to pressure and temperature sensing on aircraft in general.

Referring to FIG. 1, an aircraft 10 is shown. The aircraft 10 includes a gas turbine engine 12 and the pressure and temperature sensor 100. The gas turbine engine 12 includes a compressor section 14, a combustor section 16, a turbine section 18 and an engine controller 20. The compressor section 14 has a compressor inlet 22 and is arranged to compress an ambient air flow 24 ingested from the external environment 26 to generate a compressed air flow 28. The combustor section 16 is fluidly coupled to the compressor section 14 and is arranged to generate a high-pressure combustion product flow 30 using the compressed air flow 28. The turbine section 18 is fluidly coupled to the combustor section 16 and is arranged to extract work from the high-pressure combustion product flow 30 as the high-pressure combustion product flow 30 traverses the turbine section 18. In certain examples the gas turbine engine 12 is an aircraft main engine. In accordance with certain examples the gas turbine engine 12 is an auxiliary power unit for an aircraft.

The pressure and temperature sensor 100 is seated within the compressor inlet 22 of the compressor section 14 of the gas turbine engine 12 and is in communication with the engine controller 20 to provide pressure and temperature information to the engine controller 20. In certain examples a pressure transducer 32 couples the pressure and temperature sensor 100 to the engine controller 20 to generate a pressure signal 34 indicating pressure of the ambient air flow 24. In accordance with certain examples a temperature transducer 36 couples the pressure and temperature sensor 100 to the engine controller 20 to generate a temperature signal 38 indicating temperature of the ambient air flow 24. It is contemplated that the pressure and temperature sensor 100 can be a total pressure and a total temperature sensor 100, e.g., a P2T2 sensor fixed to the gas turbine 12 to measure compressor (or fan) inlet pressure and temperature or a P25T25 sensor fixed to the gas turbine engine 12 to measure pressure and temperature at a location fluidly between low-pressure and high-pressure segments of compressor section 14.

The engine controller 20 is programmed to monitor pressure and/or temperature of the ambient air flow 24 using the pressure signal 34 and/or temperature signal 38. It is also contemplated that the engine controller 20 be programmed to control operation of the gas turbine engine 12 using the pressure signal 34 and/or temperature signal 38. In certain examples the engine controller 20 includes a full-authority digital engine controller (FADEC) device.

As will be appreciated by those of skill in the art in view of the present disclosure, the ambient air flow 24 can contain entrained ice crystals and/or super-cooled moisture 40. As will also be appreciated by those of skill in the art in view of the present disclosure, entrained ice crystals and/or super-cooled moisture can interfere with operation of the pressure and temperature sensor 100. For example, ice crystals entrained within the ambient air flow 24 can potentially interrupt communication of pressure of the ambient air flow 24 to the engine control and/or introduce anomalies into the pressure signal and/or temperature signal generated by the pressure and temperature sensor 100. Super-cooled moisture entrained within the ambient air flow 24 can also cause ice accretion within and on the exterior of the pressure and temperature sensor 100, such as during flight of the aircraft 10 in icing conditions, potentially also interrupt communication of pressure of the ambient air flow 24 to the engine control and/or introduce anomalies into the pressure signal and/or temperature signal generated by the pressure and temperature sensor 100. To limit (or prevent entirely) interruption and/or measurement anomalies the pressure and temperature sensor 100 is provided with one or more ice protection features, as will be described.

Figure 2:
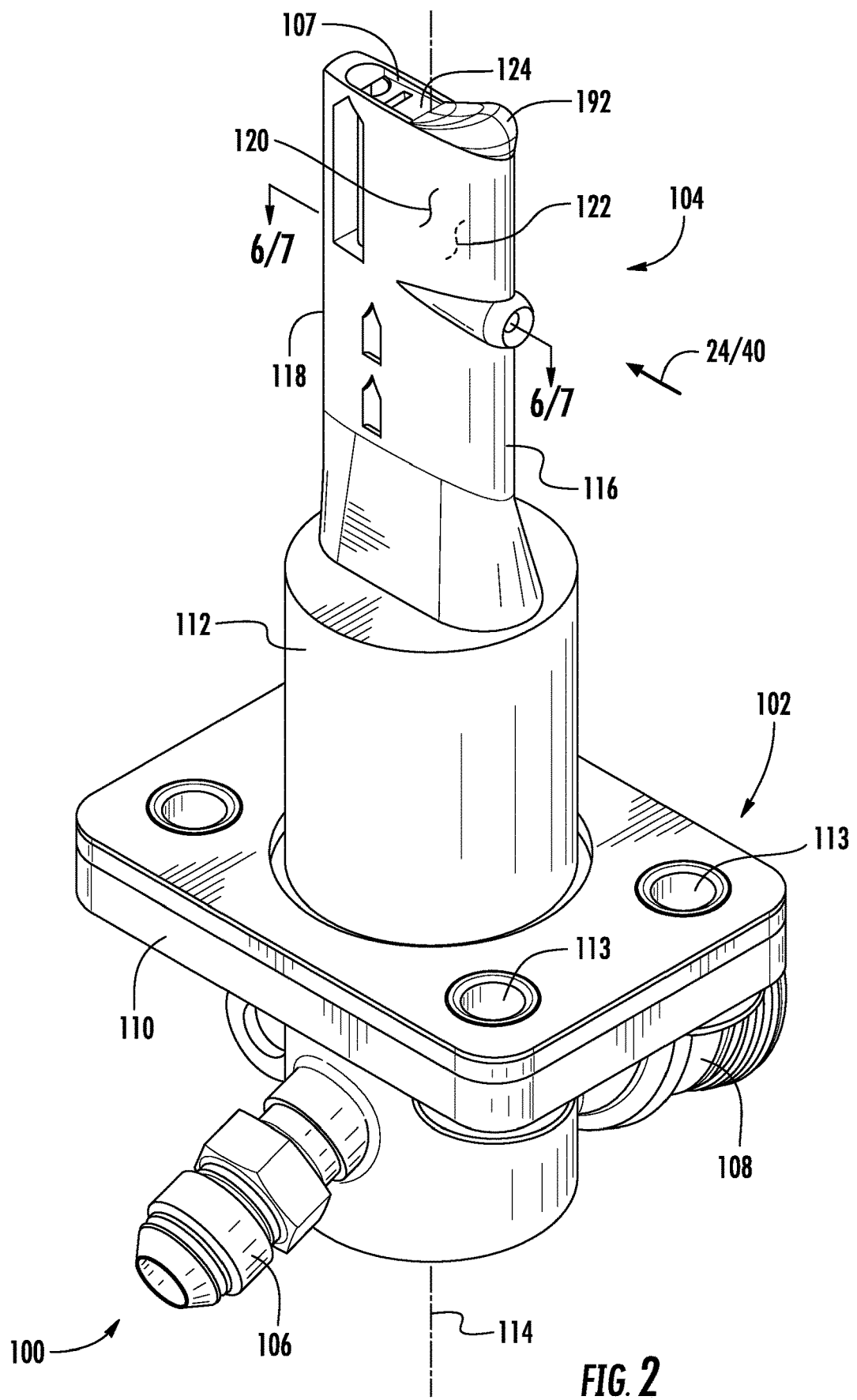
FIG. 2 is a perspective view of the sensor of FIG. 1 according to an example, showing a mount and an airfoil body of the sensor.

With reference to FIGS. 2-7, the pressure and temperature sensor 100 is shown. As shown in FIG. 2, the pressure and temperature sensor 100 includes a mount 102 and an airfoil body 104. The mount 102 has a fluid fitting 106, an electrical connector 108, a flange portion 110 and a pedestal portion 112. The fluid fitting 106 and the electrical connector 108 are seated to the mount a side the flange portion 110 opposite the airfoil body 104. The flange portion 110 has a fastener pattern 113 defined therethrough for fixation of the pressure and temperature sensor 100 within the compressor inlet 22 (shown in FIG. 1) of the compressor section 14 (shown in FIG. 1). The pedestal portion 112 extends from the flange portion 110 in a direction opposite both the fluid fitting 106 and the electrical connector 108. The airfoil body 104 is fixed with the pedestal portion 112.

The airfoil body 104 extends axially from the mount 102, defines a sensor axis 114, and has a leading edge 116, a trailing edge 118, a first face 120, a second face 122 and a tip surface 124. The first face 120 extends between the leading edge 116 and the trailing edge 118 of the airfoil body 104 and faces in a direction opposite that of the electrical connector 108. The second face 122 extends between the leading edge 116 and the trailing edge 118 of the airfoil body 104 and faces in a direction opposite that of the fluid fitting 106. The tip surface 124 axially spans the leading edge 116 and the trailing edge 118, laterally spans the first face 120 and the second face 122 and intersects the sensor axis 114. In certain examples the airfoil body 104 defines the sensor axis 114.

Figure 3:
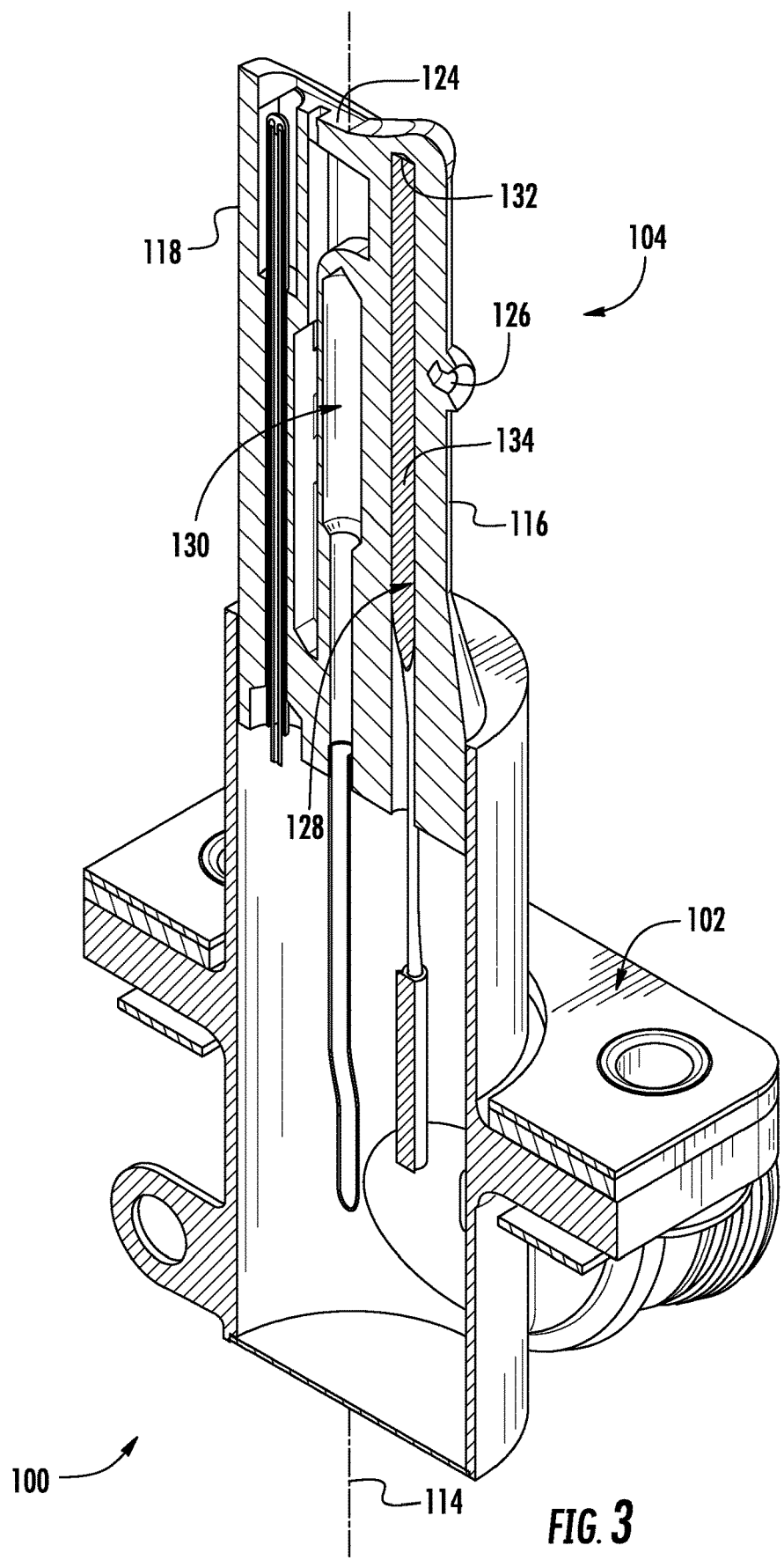
FIG. 3 is a cross-sectional view of the sensor of FIG. 1 according to the example, showing a pressure channel defined chordwise between a heater element seat and a temperature probe within the airfoil body of the sensor.

As shown in FIG. 3, the airfoil body 104 has pressure inlet 126. The airfoil body 104 also defines a heater element seat 128 and a pressure channel 130 within its interior. The pressure inlet 126 is arranged on the leading edge 116 of the airfoil body 104 and is in fluid communication with the pressure channel 130. The heater element seat 128 is defined chordwise between the leading edge 116 of the airfoil body 104 and the trailing edge 118 of the airfoil body 104, extends from the mount 102 and axially within the airfoil body 104, and has a heater element seat terminus 132 located axially between the pressure inlet 126 and the tip surface 124 of the airfoil body 104. A heater element 134 is positioned within the heater element seat 128 and is electrically connected by a heater element lead 136 (shown in FIG. 4) to the electrical connector 108 for heating a heated portion 138 of the airfoil body 104. In certain examples the heater element seat terminus 132 is arranged within the ice accretion feature 192.

Figure 4:
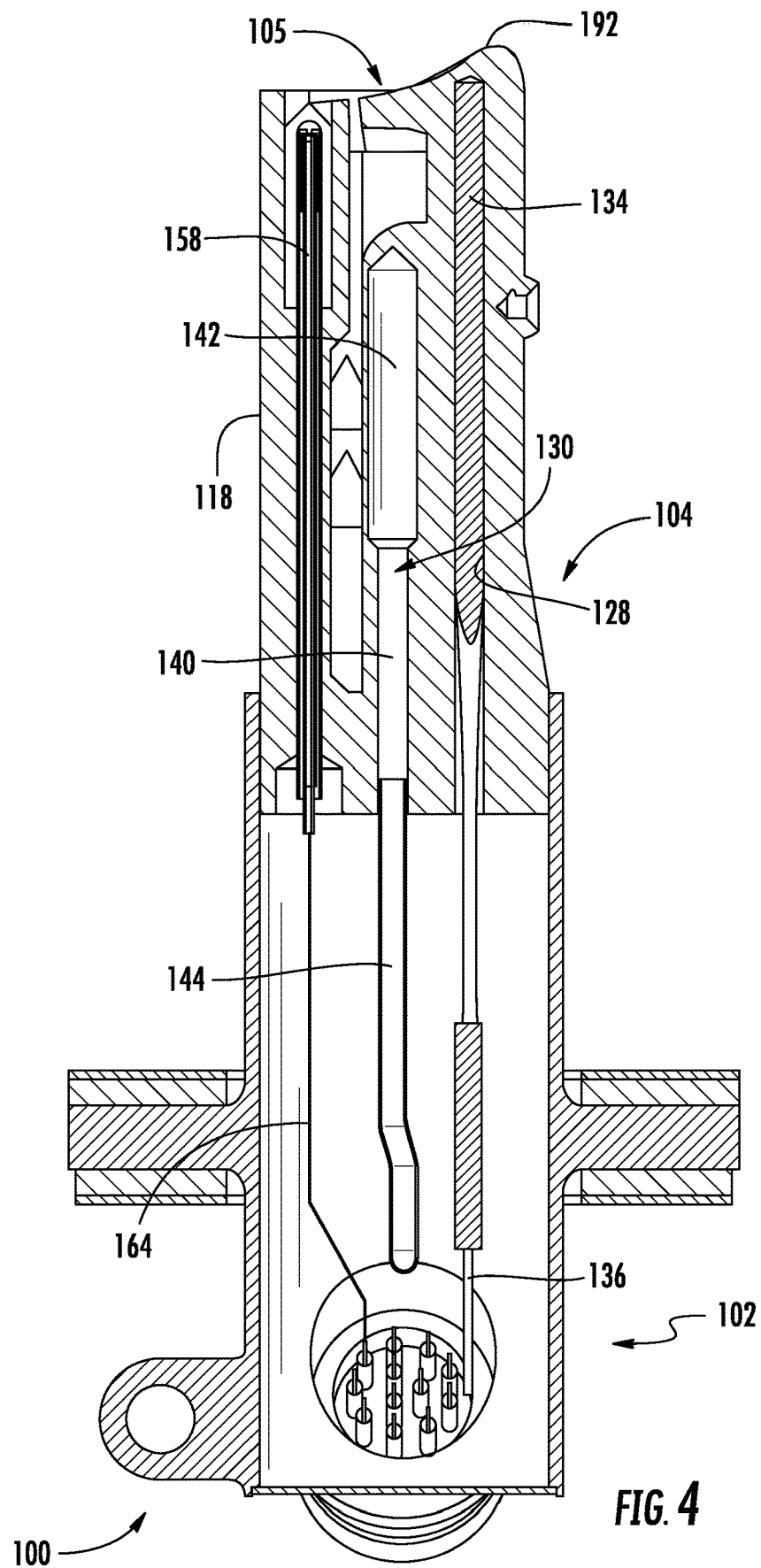
FIG. 4 is a cross-sectional side view of the sensor of FIG. 1 according to the example, showing a pressure conduit seated within the pressure channel defined within the airfoil body.
Figure 5:
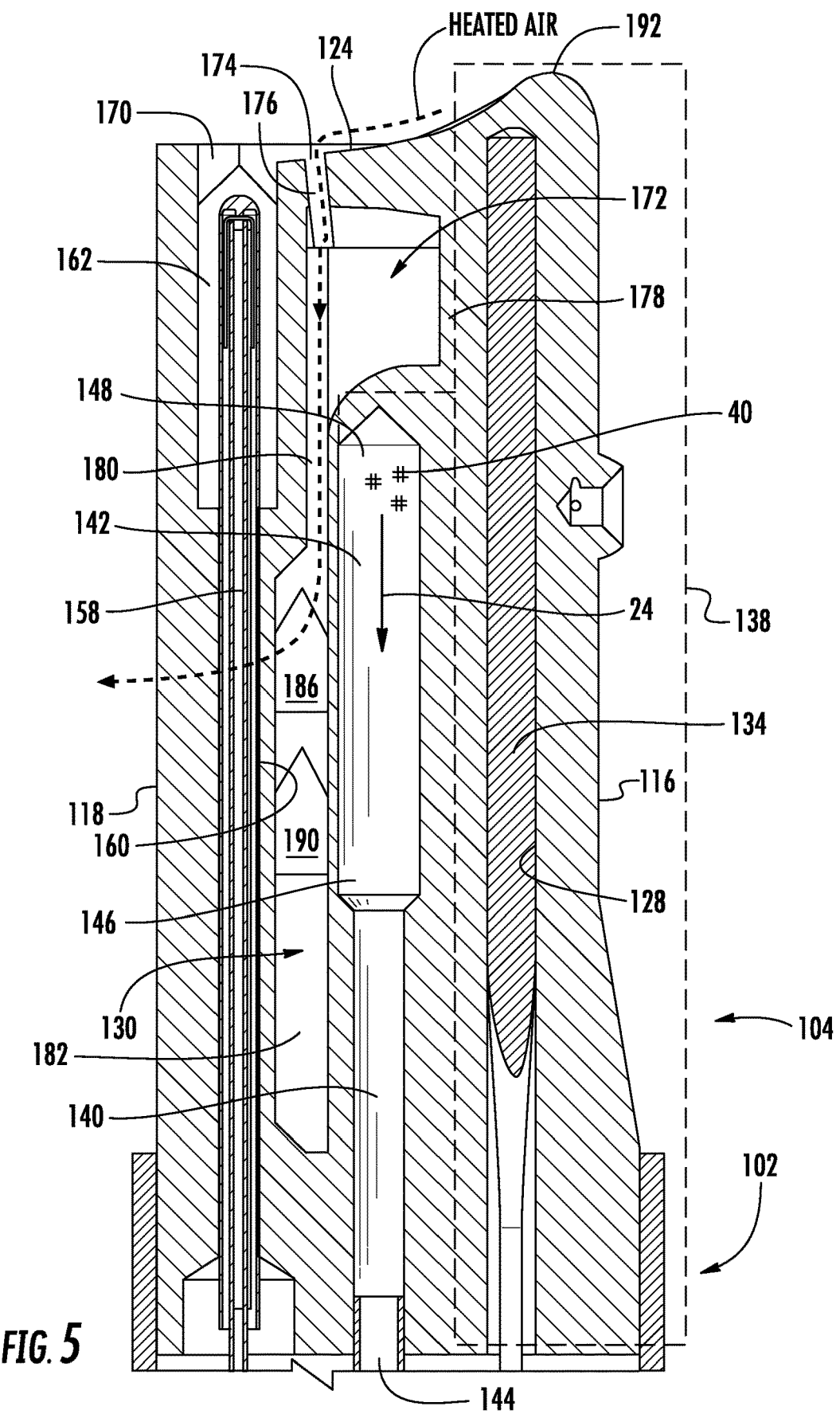
FIG. 5 is another side view of a portion of the sensor of FIG. 1 according to the example, showing a second face of the blade body defining a second face outlet vent fluidly coupled to tip surface aperture at a location forward of the temperature probe and temperature sense chamber.

As shown in FIGS. 4 and 5, the pressure channel 130 is defined along the chord of the airfoil body 104 between the heater element seat 128 and the trailing edge 118 of the airfoil body 104 and includes an outlet segment 140 and an expansion chamber 142. The outlet segment 140 extends axially within the airfoil body 104 and seats therein a pressure conduit 144. The pressure conduit 144 extends from the airfoil body 104 through the mount 102 to the fluid fitting 106 (shown in FIG. 2), and therethrough fluidly couples the outlet segment 140 of the pressure channel 130 with the pressure transducer 32 (shown in FIG. 1). As also shown in FIG. 4, an ice accretion feature terminus 105 is located chordwise between the heater element 134 and the temperature probe 158.

As shown in FIG. 5, the expansion chamber 142 extends axially within the airfoil body 104 between a first end 146 and a second end 148 within the airfoil body 104. Between the first end 146 and the second end 148 the expansion chamber 142 defines an expansion chamber flow area 150 (shown in FIG. 7). It is contemplated that the expansion chamber flow area 150 be larger than an outlet segment flow area 153 (shown in FIG. 7) to slow the velocity of air flowing through the expansion chamber 142 relative velocity of air flowing through the outlet segment 140. As will be appreciated by those of skill in the art in view of the present disclosure, slowing velocity of air flowing through the expansion chamber 142 limits the capability of the air to carry entrained ice crystals and/or super-cooled moisture 40 to the outlet segment 140. Slowing air velocity entrained ice crystals to separate from the air within the expansion chamber 142, the entrained ice collecting at the second end 148 of the expansion chamber 142 for melting using heat generated by the heater element 134 (shown in FIG. 7). Separation, collection, and melting of ice crystals entrained within air entering the airfoil body 104 reduces (or eliminates entirely) the probability that the entrained ice interrupts and induces anomalies into the pressure signal 34 (shown in FIG. 1) generated by the pressure transducer 32 (shown in FIG. 1).

Figure 6:
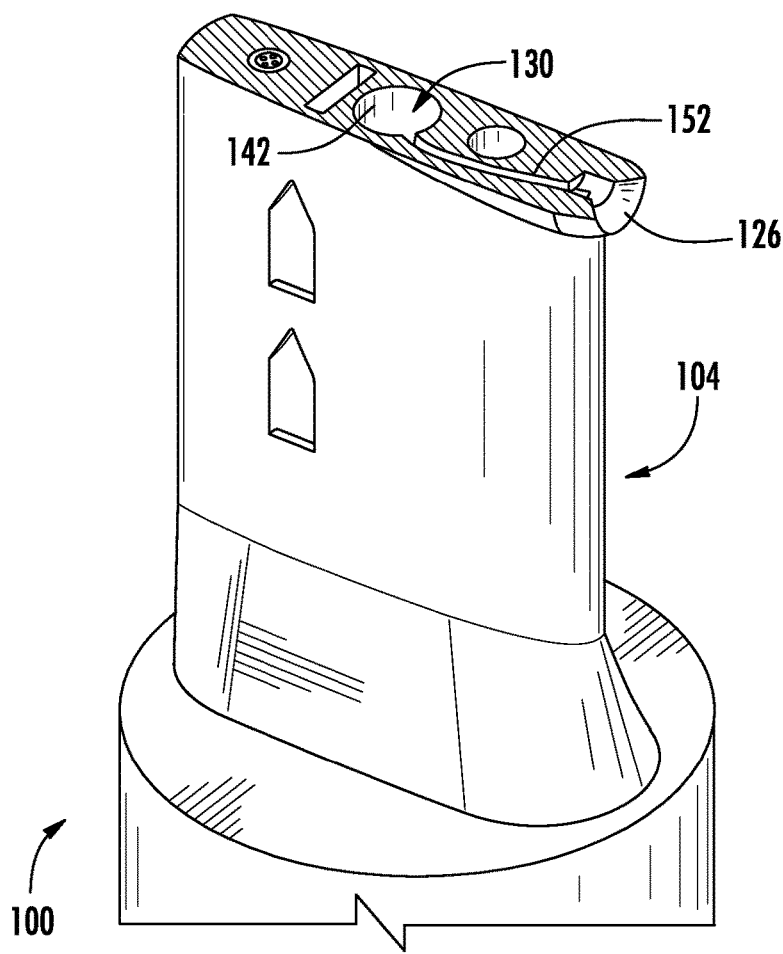
FIGS. 6 and 7 are cross-sectional views of a portion of the sensor of FIG. 1 according to the example, showing an inlet segment of the pressure channel connecting a pressure inlet to the expansion chamber within the airfoil body.
Figure 7:
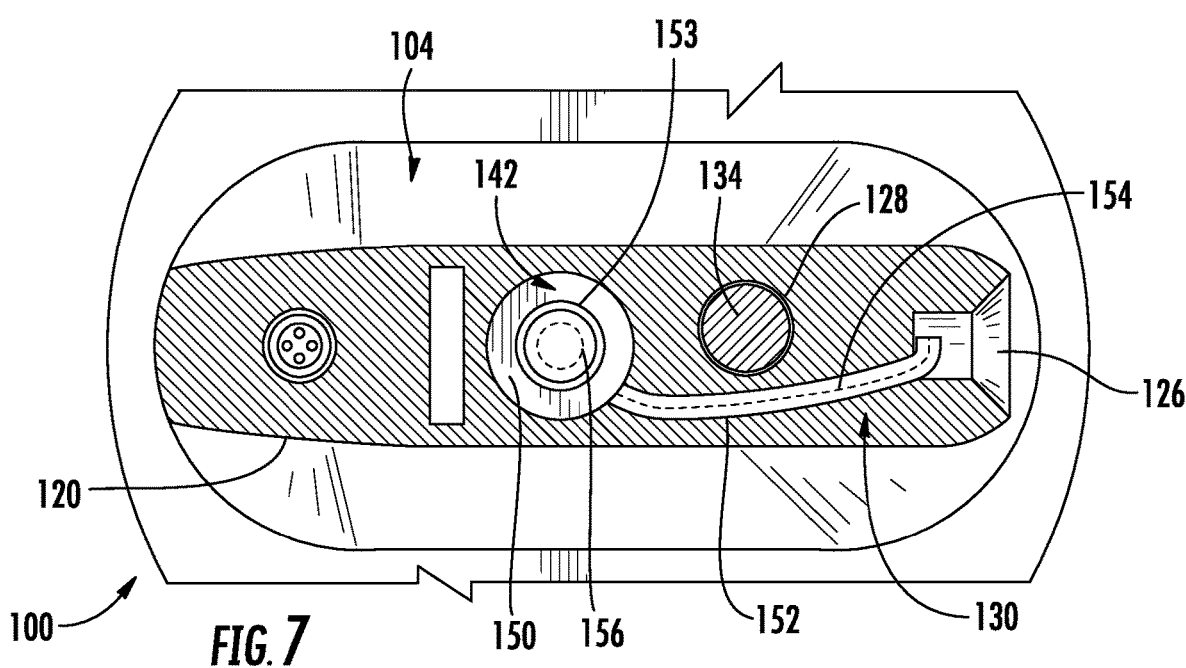

As shown in FIGS. 6 and 7, the pressure channel 130 also includes an inlet segment 152. The inlet segment 152 fluidly couples the pressure inlet 126 to the expansion chamber 142. More specifically, the inlet segment 152 traces an arcuate path 154 chordwise along the airfoil body 104 between the pressure inlet 126 and the second end 148 (shown in FIG. 5) of the expansion chamber 142. The arcuate path 154 extends laterally between the heater element seat 128 and the first face 120 of the airfoil body 104 such that air traversing the inlet segment 152 passes in close proximity to the heater element 134. Close proximity between the air and the heater element 134 increases likelihood that ice entrained within the air melts prior to arriving at the second end 148 of the expansion chamber 142, also reducing (or eliminating entirely) that the entrained ice interrupts and induces anomalies into the pressure signal 34 (shown in FIG. 1) generated by the pressure transducer 32 (shown in FIG. 1). It is contemplated that the inlet segment 152 be substantially orthogonal relative to the heater element 134 and/or the expansion chamber 142.

In certain examples the inlet segment 152 defines an inlet segment flow area 156 that is smaller than expansion chamber flow area 150. Sizing the inlet segment flow area 156 such that it is smaller than the expansion chamber flow area 150 causes flow velocity of air traversing the inlet segment 152 to decrease upon entry to the second end 148 of the expansion chamber 142. This also causes entrained ice to separate from the air within the second end 148 of the expansion chamber 142, the entrained ice collecting at the second end 148 of the expansion chamber 142 reducing (or eliminating entirely) that the entrained ice interrupts and induces anomalies into the pressure signal 34 (shown in FIG. 1) generated by the pressure transducer 32 (shown in FIG. 1).

Figure 8:
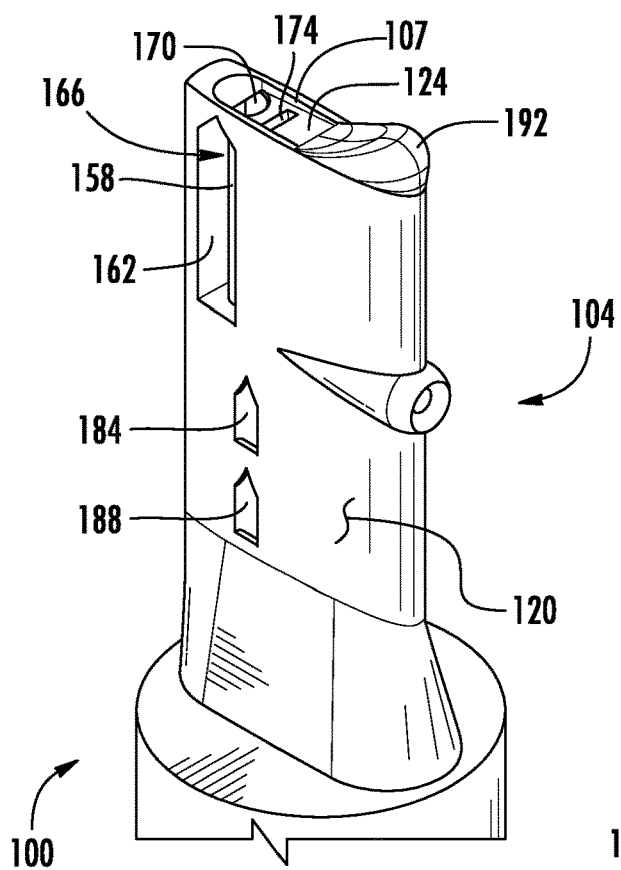
FIGS. 8 and 9 are perspective of a portion of the sensor of FIG. 1 according to the example, showing inlet vents and outlet vents of the insulating cavity in faces of the airfoil body connected to tip surface inlet of the insulating cavity.
Figure 9:
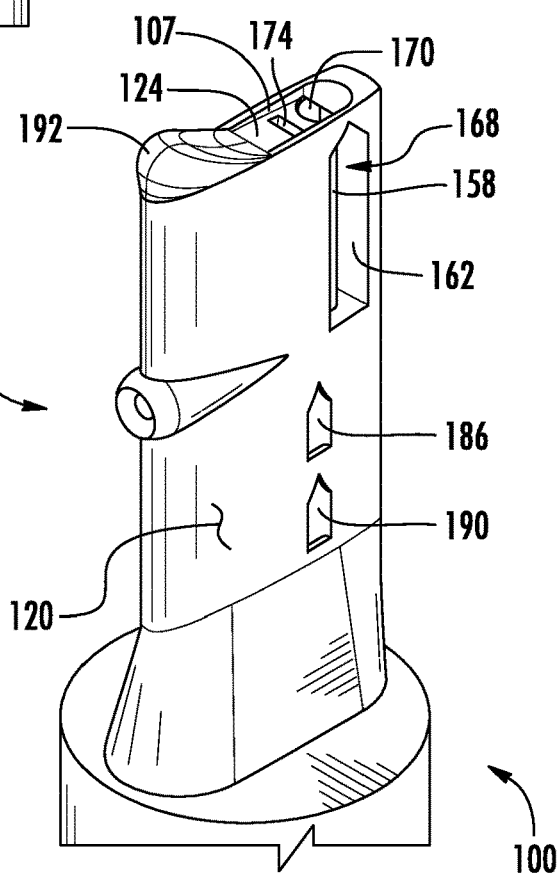

With reference to FIGS. 5, 8 and 9, it is contemplated that the pressure and temperature sensor 100 includes a temperature probe 158. As shown in FIG. 5, the airfoil body 104 defines a temperature probe seat 160 chordwise between the expansion chamber 142 and the trailing edge 118 of the airfoil body 104. The temperature probe seat 160 extends axially between the mount 102 and a temperature sense chamber 162 such that a tip portion of the temperature probe 158 is arranged within the temperature sense chamber 162. A temperature probe lead 164 (shown in FIG. 4) electrically connects the temperature probe 158 to the electrical connector 108 and therethrough with the temperature transducer 36 (shown in FIG. 1).

As shown in FIGS. 8 and 9, the temperature sense chamber 162 is in fluid communication with the external environment 26 (shown in FIG. 1) through a first face aperture 166, a second face aperture 168, and a tip surface aperture 170. The first face aperture 166 extends through the first face 120 of the airfoil body 104 and fluidly couples the temperature sense chamber 162 to the external environment 26 through the first face aperture 166. The second face aperture 168 extends through the second face 122 and fluidly couples the temperature sense chamber 162 to the external environment 26 through the second face aperture 168. The tip surface aperture 170 extends through the tip surface 124 and fluidly couples the temperature sense chamber 162 through the tip surface aperture 170.

With continuing reference to FIG. 5, the airfoil body 104 defines within its interior an insulating cavity 172. The insulating cavity 172 is defined chordwise between the temperature probe seat 160 and the expansion chamber 142. The insulating cavity 172 also extends axially between the tip surface 124 and the mount 102 to provide a thermal break between the temperature probe seat 160 and the heater element seat 128 to limit (or eliminate entirely) thermal communication between the heater element 134 (show in FIG. 7) and the temperature probe 158. The insulating cavity 172 has an insulating cavity inlet 174, an insulating cavity inlet channel 176, and an insulating cavity tip chamber 178. The insulating cavity 172 also has an insulating cavity interconnect channel 180, an insulating cavity base chamber 182, a first face outlet vent 184 (shown in FIG. 8), and a second face outlet vent 186.

The insulating cavity inlet 174 is defined chordwise between the tip surface aperture 170 and the leading edge 116 of the airfoil body 104. The insulating cavity inlet channel 176 is in fluid communication with the external environment 26 (shown in FIG. 1) through the insulating cavity inlet 174 and extends from the tip surface 124 to the insulating cavity tip chamber 178. The insulating cavity tip chamber 178 defines a volume within the airfoil body 104 extending forward from the temperature sense chamber 162 and toward the leading edge 116 of the airfoil body 104. It is contemplated that the insulating cavity tip chamber 178 axially separate the tip surface 124 of the airfoil body 104 from the second end 148 of the expansion chamber 142.

The insulating cavity interconnect channel 180 is in fluid communication with the insulating cavity tip chamber 178, is defined chordwise within the airfoil body 104 between the temperature sense chamber 162 and the expansion chamber 142, and extends axially within the airfoil body 104 toward the mount 102. The insulating cavity base chamber 182 is in fluid communication with the insulating cavity interconnect channel 180, is defined chordwise between the temperature probe seat 160 and the expansion chamber 142, and extends axially upwards through the airfoil body 104 toward the mount 102. It is contemplated that the insulating cavity base chamber 182 extend upwards to a location between first face outlet vent 184 and the mount 102.

The first face outlet vent 184 extends through the first face 120 of the airfoil body 104 and fluidly connects the insulating cavity base chamber 182 to the external environment 26 (shown in FIG. 1). The second face outlet vent 186 extends through the second face 122, is laterally opposite the first face outlet vent 184 such that the second face outlet vent 186 is in registration with the first face outlet vent 184, and fluidly connects the insulating cavity base chamber 182 of the insulating cavity 172 to the external environment 26. In certain examples the first face outlet vent 184 is a first face outlet vent 184 axially stacked with a first face second outlet vent 188 also fluidly connecting the insulating cavity base chamber 182 of the insulating cavity 172 to the external environment 26. In accordance with certain examples the second face outlet vent 186 is a second face first outlet vent 186 axially stacked with a second face second outlet vent 190 also fluidly connecting the insulating cavity base chamber 182 to the external environment 26.

Figure 10:
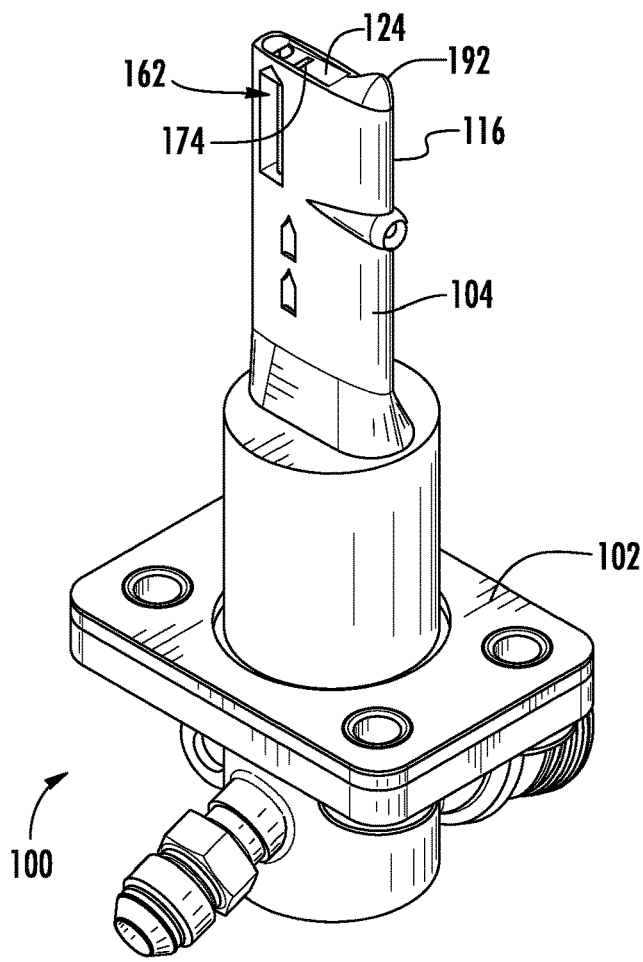
FIGS. 10 and 11 are perspective and partial perspective views of the sensor of FIG. 1 according to the example, showing an ice accretion feature extending from the tip surface of the airfoil body of the sensor.
Figure 11:
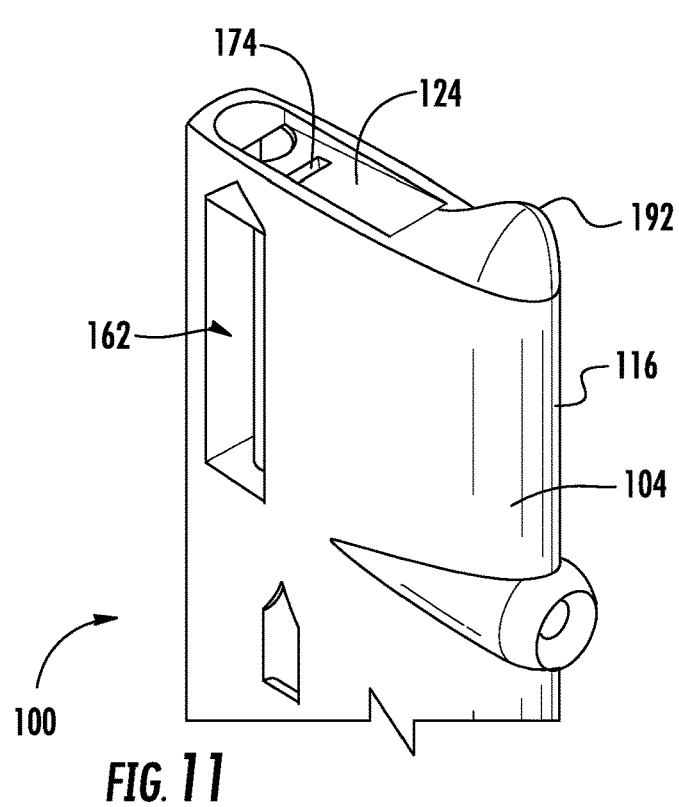

With reference to FIGS. 10-17, examples of the pressure and temperature sensor 100 including an ice accretion feature 192 are shown. As shown in FIG. 10, the airfoil body 104 has an ice accretion feature 192. The ice accretion feature 192 extends from the tip surface 124 in a direction opposite the mount 102 and is defined chordwise at the leading edge 116 of the airfoil body 104. More specifically, the ice accretion feature 192 extends from the tip surface 124 at a location chordwise forward of the insulating cavity inlet 174 of the insulating cavity 172 adjacent the heated portion 138 (shown in FIG. 5) of the airfoil body 104. Relative to the inlet 22 (shown in FIG. 1) of the compressor section 14 (shown in FIG. 1) of the gas turbine engine 12 (shown in FIG. 1), the ice accretion feature 192 extends downward relative to gravity when the aircraft 10 (shown in FIG. 1) is in straight and level flight.

Figure 12:
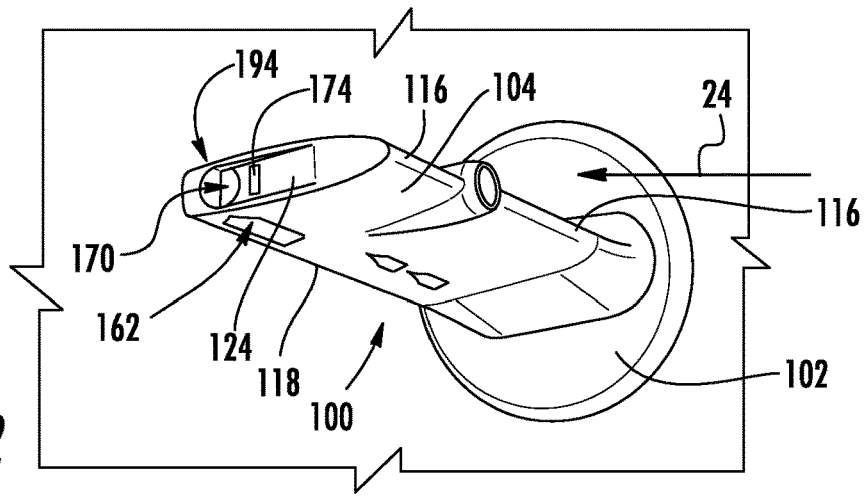
FIGS. 12-14 are perspective views of the sensor of FIG. 1 according to an example without the ice accretion feature, showing ice accretion initiating at a location aft of the leading edge and growing toward the leading edge of the airfoil body.
Figure 13:
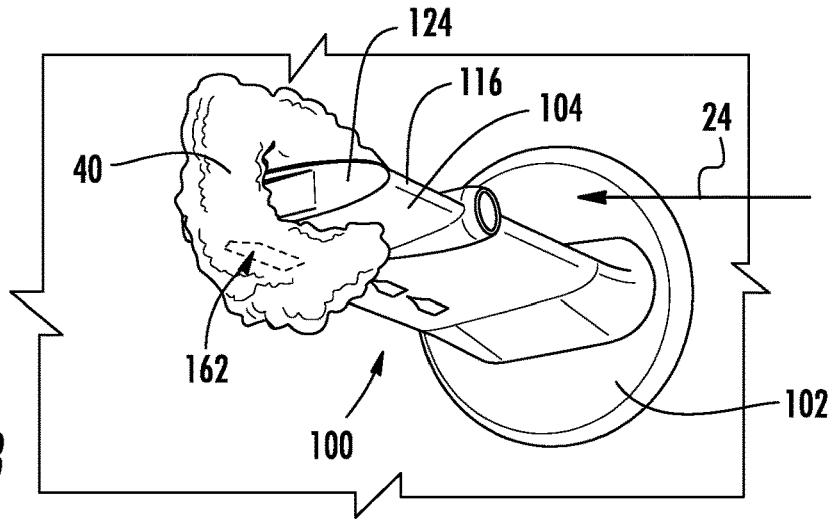
Figure 14:
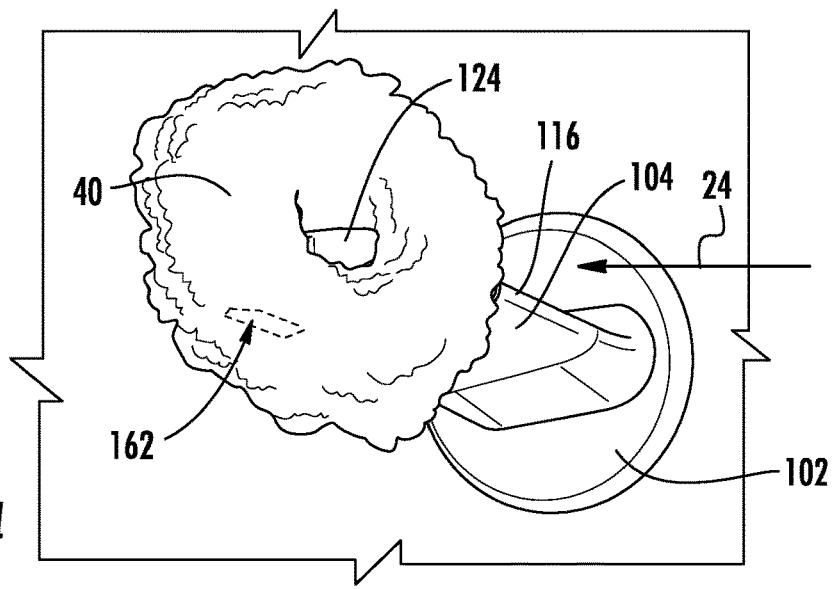

As shown in FIGS. 12-15, during operation in icing conditions ambient air containing super-cooled moisture, e.g., the ambient air flow 24, flows across the tip surface 124 of the airfoil body 104. As shown in FIG. 12, ice accretion typically begins at an initiation location 194 chordwise along the airfoil body 104 between the trailing edge 118 and the leading edge 116 of the airfoil body 104. The initiation location 194 is generally located at the trailing edge of the tip surface aperture 170 due to the collection efficiency at that location. As shown in FIGS. 13 and 14, once initiated, entrained ice crystals and/or super-cooled moisture 40 accretes in a direction forward along the airfoil body 104 relative to the insulating cavity inlet 174 and toward the leading edge 116 of the airfoil body 104. Ice accretion generally continues until the mass of the ice formation is sufficiently large that the stress exerted on the ice formation causes the ice formation to fraction, the accretion resulting from entrained ice crystals and/or super-cooled moisture 40 thereafter separating from the airfoil body 104.

Figure 15:
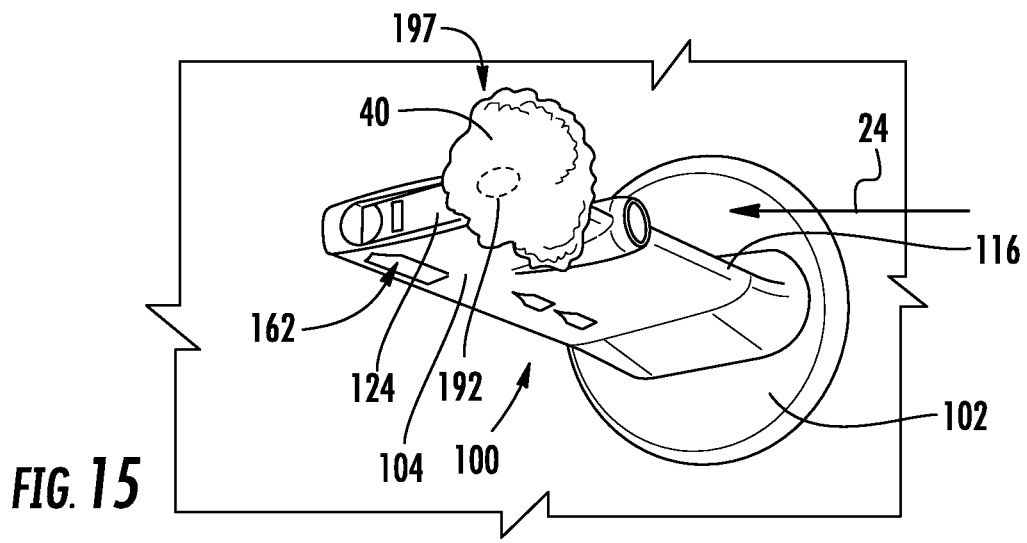
FIG. 15 is a perspective view of the sensor of FIG. 1 according to the example, showing ice accreting from a location proximate the leading edge of the airfoil body.

As shown in FIG. 15, when included on the airfoil body 104, the ice accretion feature 192 causes ice accretion to initiate at a location 197 proximate the leading edge 116 in relation to examples of the airfoil body 104 not having the ice accretion feature 192. Without being bound by a particular theory it is believed that air flowing across the ice accretion feature 192 creates a relatively high collection efficiency location. The higher collection efficiency created by the ice accretion feature 192 causes super-cooled moisture within the air flowing across the airfoil body 104 to preferentially accrete forward of the tip surface aperture 170 at a location between the insulating cavity inlet 174 and the leading edge 116 of the airfoil body 104. Preferentially accreting ice forward of the tip surface aperture 170 in turn reduces the collection efficiency at the tip surface aperture 170 and prolongs the time interval during which the tip surface aperture 170 remains ice-free during flight in icing conditions, limiting (or eliminating entirely) the tendency of accreted ice to accrete within the temperature sense chamber 162 where ice accretion could otherwise interrupt the ability of the temperature probe 158 to accurate measure temperature of the ambient air flow 24 (shown in FIG. 1).

Figure 16:
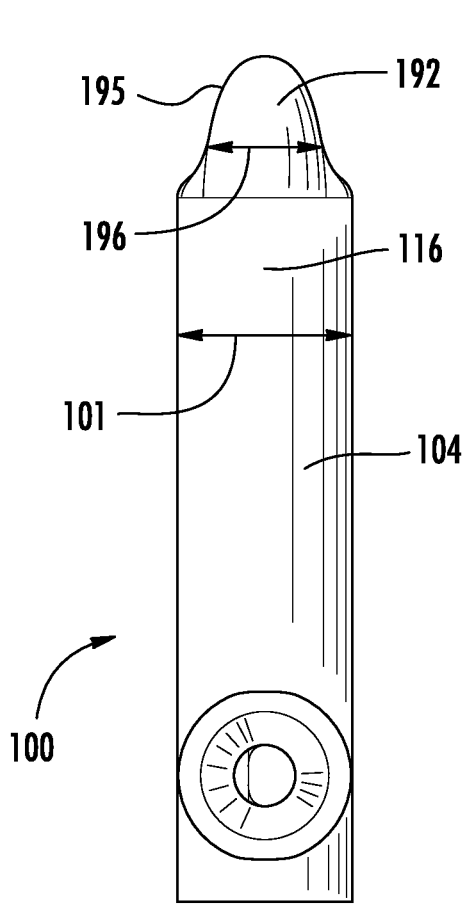
FIGS. 16 and 17 are partial front view of the sensor of FIG. 1 according the first and a second example, showing ice accretion features with a fin-like body and a spherical body, respectively.
Figure 17:
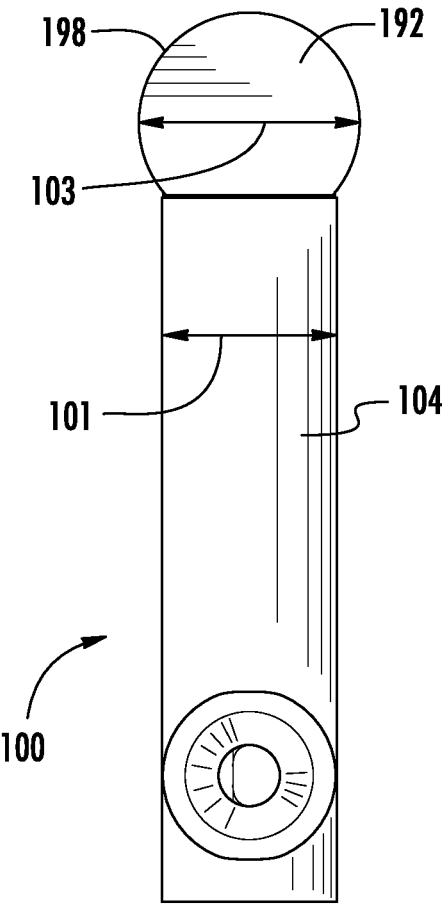

As shown in FIG. 16, in certain examples the ice accretion feature 192 can define a fin body 195 having a fin body width 196 that is smaller than an airfoil width 101 of the airfoil body 104. As shown in FIG. 17, it is also contemplated that the ice accretion feature 192 can define a spherical body 198 having a spherical body width 103 that is greater the airfoil width 101 of the airfoil body 104. As will be appreciated by those of skill in the art in view of the present disclosure, larger ice accretion features tend to reduce the collection efficiency at the tip surface aperture 170 as compared to ice accretion features having smaller widths. The spherical body 198 produces smaller ice accretions at the tip surface aperture 170 than the fin body 195 when subjected to an otherwise identical set of icing conditions.

Figure 18:
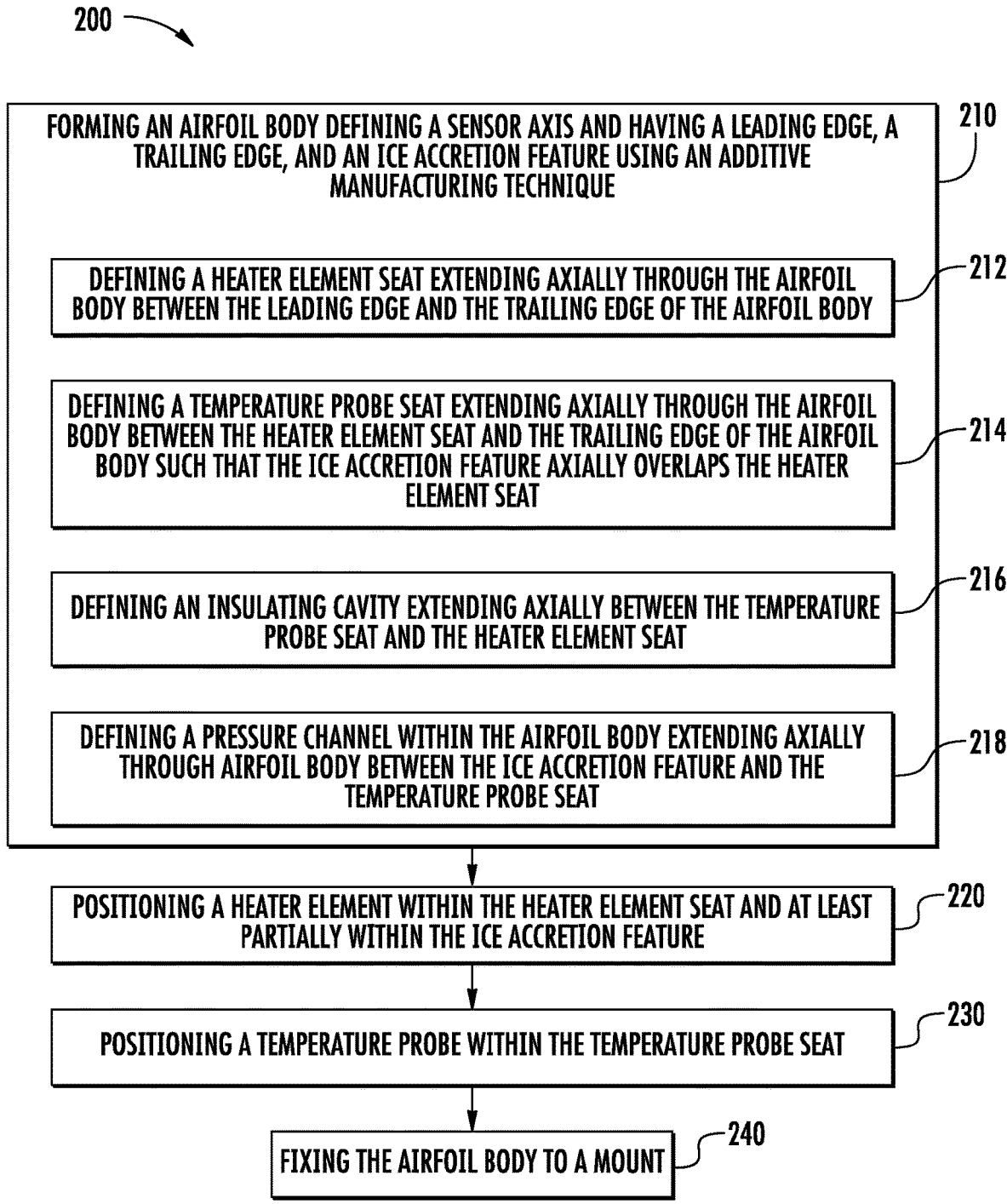
FIG. 18 is a block diagram of a method of making sensor in accordance with the present disclosure, showing operations of the method according to an illustrative and non-limiting example of the method.

With reference to FIG. 18, a method 200 of making a sensor, e.g., the pressure and temperature sensor 100 (shown in FIG. 1), is shown. The method 200 includes forming an airfoil body defining a sensor axis and having a leading edge, a trailing edge, and an ice accretion feature, e.g., the airfoil body 104 (shown in FIG. 2) having the leading edge 116 (shown in FIG. 2) and the trailing edge 118 (shown in FIG. 2), using an additive manufacturing technique, as shown with box 210. Examples of suitable additive manufacturing technique include laser sintering and powder bed fusion techniques. It also contemplated that the airfoil body can be formed using a casting technique and remain within the scope of the present disclosure.

As shown with box 212, it is contemplated that forming the airfoil body include defining a heater element seat, e.g. the heater element seat 128 (shown in FIG. 4), extending axially through the airfoil body (e.g., at a chordwise location) between the leading edge and the trailing edge of the airfoil body. As shown with box 214, it is also contemplated that forming the airfoil body include defining a temperature probe seat, e.g., the temperature probe seat 160 (shown in FIG. 5), extending axially through the airfoil body between the heater element seat and the trailing edge of the airfoil body such that the ice accretion feature axially overlaps the heat element seat.

In certain examples forming the airfoil body can include defining an insulating cavity, e.g., the insulating cavity 172 (shown in FIG. 5), extending axially between the temperature probe seat and the heater element seat, as shown with box 216. In accordance with certain examples, forming the airfoil body can include defining a pressure channel, e.g., the pressure channel 130 (shown in FIG. 3), extending axially through the airfoil body between the ice accretion feature and the temperature probe seat, as shown with box 218.

As shown with box 220, the method 200 also includes positioning a heater element, e.g., the heater element 134 (shown in FIG. 3), within the heater element seat. As shown with box 230, the method additionally includes positioning a temperature probe, e.g., the temperature probe 158 (shown in FIG. 5), within the temperature probe seat. It is also contemplated that, in accordance with certain examples, that the method 200 include fixing the airfoil body to a mount, e.g., the mount 102 (shown in FIG. 2), as shown with box 240.

Figure 19:
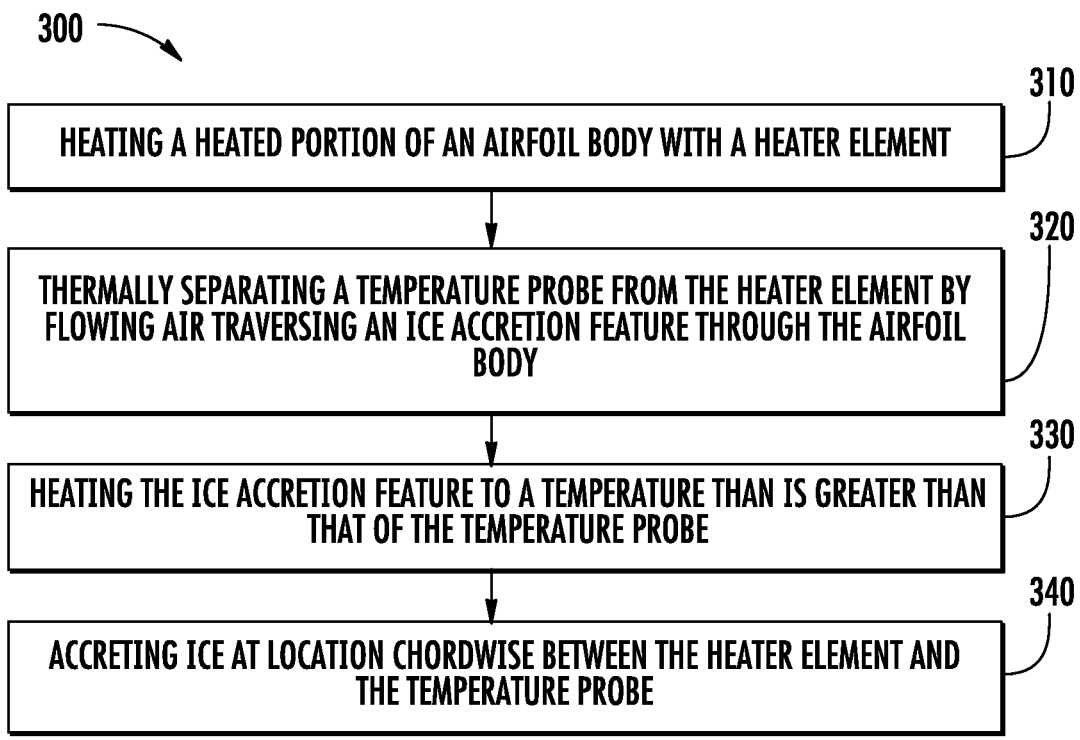
FIG. 19 is a block diagram of a method of controlling ice accretion on a sensor in accordance with the present disclosure, showing operations of the method according to an illustrative and non-limiting example of the method.

With reference to FIG. 19, a method 300 of controlling ice accretion on a sensor, e.g., the pressure and temperature sensor 100 (shown in FIG. 1), is shown. The method 300 includes heating a heated portion of an airfoil body with the heater element, e.g., the heated portion 138 (shown in FIG. 5) of the airfoil body 104 (shown in FIG. 2) with the heater element 134 (shown in FIG. 7), as shown with box 310. As shown with box 320, the method 300 also includes thermally separating a temperature probe, e.g., the temperature probe

158 (shown in FIG. 5), from the heater element by flowing air traversing an ice accretion feature, e.g., the ice accretion feature 192 (shown in FIG. 10), through the airfoil body. As shown with box 330 and box 340, the ice accretion feature is heated to a temperature than is greater than that of the temperature probe and ice accreted at location that is defined chordwise between the heater element and the temperature probe. It is contemplated that the locate be forward a temperature sense chamber defined by the airfoil body, e.g., the temperature sense chamber 162 (shown in FIG. 5), and through which the temperature probe is in direct fluid communication with an environment external to the airfoil body, e.g., the external environment 26 (shown in FIG. 1), and ice, e.g., the ice 40 (shown in FIG. 1), thereafter accrete is a direction forward of the location, as shown in FIGS. 13 and 14. In certain examples ice accretes at a location chordwise forward of a tip surface aperture, e.g., the tip surface aperture 170 (shown in FIG. 5).

Sensors can be used to measure pressure and temperature of air ingested by gas turbine engines. Such sensors can protrude into the airflow entering the compressor section of the gas turbine engine, or between the low-pressure and high-pressure segments of compressors, to provide pressure and temperature information. The pressure and temperature measurements can be employed, for example, for monitoring the operating conditions of the gas turbine engine as well as for controlling the gas turbine engine.

In some sensors ice and super-cooled moisture entrained within the airflow entering the sensor can interfere with the operation of the sensor. For example, ice crystals can be driven into passageways defined within such sensors. Once within the sensor passageways the ice crystals can interrupt operation of the sensor and/or cause the sensor to provide anomalous sensor measurements. Super-cooled moisture can also accrete on the exterior of such sensors, potentially blocking entrances and/or exits from the passageways defined within the sensor. Such ice accretions can also interrupt operation of the sensor and/or cause the sensor to provide anomalous sensor measurements. And while sensor heating can be employed to mitigate the effects of either (or both) entrained ice crystals and super-cooled moisture, heat from sensor heating can itself introduce error into measurements provided by certain sensors.

In examples described herein sensors have pressure channels therein with inlet segments in close proximity to a heater element. The close proximity of the inlet segment enables heat from the heater element to melt ice crystals entrained within air traversing the inlet segment of the pressure passage, limiting (or eliminating entirely) the probability of entrained ice crystals from interfering with operation of the sensor. In accordance with certain examples sensors described herein have pressure channels with expansion chambers. The expansion chambers slow velocity of air traversing the pressure channel, separating and impounding the entrained ice crystals such heat from the heater element can melt the ice. Impounding and/or melting the separated ice crystals limits (or eliminates entirely) the probability that the entrained ice crystals will interfere with operation of the sensor.

It is contemplated that sensors described herein include an insulating cavity. The insulating cavity is defined chordwise between the leading edge and the trailing edge of the airfoil body at location between the heater element and a temperature probe seated in the airfoil body. So situated the insulating cavity limits (or prevents entirely) heat from the heater element reaching the temperature probe, the insulating cavity thereby reducing (or eliminating entirely) probability that heat from the heater element introduce error into temperature measurements acquired by the temperature probe.

It is also contemplated that, in accordance with certain examples, that the airfoil body have an ice accretion feature. The ice accretion feature is arranged such that ice accreted from super-cooled moisture traversing the airfoil body of the sensor preferentially accrete at a location chordwise forward inlets and/or vents defined within the airfoil body and in communication with the temperature probe and insulating cavity, respectively. This increases the time interval during exposure to icing conditions during which the sensor can reliably provide temperature data, limiting (or eliminating entirely) the probability of interruption and/or measurement anomalies due to ice accretion on the exterior of the sensor. Further examples of the ice accretion are arranged for shedding accreted ice relatively quickly and while the ice accretion is relatively small.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor, comprising:
    an airfoil body defining a sensor axis and having a leading edge, a trailing edge, an ice accretion feature and a tip surface extending from the ice accretion feature to the trailing edge;
    a heater element extending axially through the airfoil body between the leading edge and the trailing edge of the airfoil body; and
    a temperature probe extending axially through the airfoil body between the heater element and the trailing edge of the airfoil body, wherein the heater element is axially overlapped by the ice accretion feature to accrete ice chordwise forward of the tip surface;
    wherein the ice accretion feature extends from the leading edge of the airfoil body to an ice accretion feature terminus that is located chordwise between the heater element and the temperature probe.

2. The sensor of claim 1, wherein the airfoil body has a first face and a second face defining therebetween an airfoil width, and wherein the ice accretion feature has an ice accretion feature width that is smaller than the airfoil width.

3. The sensor of claim 1, wherein the airfoil body has a spherical body extending from the leading edge to the ice accretion feature terminus that is located chordwise between the heater element and the temperature probe.

4. The sensor of claim 1, wherein the airfoil body defines therethrough an insulating cavity extending axially through the airfoil body between the temperature probe and the heater element.

5. The sensor of claim 4, wherein the airfoil body has a first face defining a first face outlet vent, the first face outlet vent in fluid communication with the insulating cavity.

6. The sensor of claim 5, wherein the airfoil body has a second face defining a second face outlet vent, the second face outlet vent in fluid communication with the insulating cavity and in registration with the first face outlet vent.

7. The sensor of claim 1, wherein the tip surface defines an insulating cavity inlet that is located chordwise between the ice accretion feature and the temperature probe.

8. The sensor of claim 7, wherein the airfoil body has a first face with a first face outlet vent and defines therethrough an insulating cavity, the insulating cavity fluidly coupling the insulating cavity inlet with the first face outlet vent.

9. The sensor of claim 8, wherein the airfoil body has a second face with a second face outlet vent, wherein the insulating cavity inlet is fluidly coupled to the second face outlet vent by the insulating cavity.

10. The sensor of claim 1, wherein the airfoil body defines a temperature sense chamber that is located chordwise between the trailing edge of the airfoil body and the heater element, wherein the temperature probe extends at least partially through the temperature sense chamber.

11. The sensor of the claim 10, wherein the airfoil body has a first face extending between the leading edge and the trailing edge of the airfoil body, the first face defining therethrough a first face aperture, wherein the temperature sense chamber is fluidly coupled to an environment external to the airfoil body by the first face aperture.

12. The sensor of claim 11, wherein the airfoil body has a second face extending between the leading edge and the trailing edge of the airfoil body, the second face defining therethrough a second face aperture, wherein the second face aperture is in registration with the first face aperture.

13. The sensor of claim 12, wherein the temperature sense chamber is fluidly coupled to the environment external to the airfoil body by the second face aperture.

14. The sensor of claim 1, wherein the sensor is a P2T2 sensor or a P25T25 sensor fixed to a gas turbine engine.

15. A sensor, comprising:
   an airfoil body defining a sensor axis and having a leading edge, a trailing edge, an ice accretion feature and a tip surface extending from the ice accretion feature to the trailing edge;
   a heater element extending axially through the airfoil body between the leading edge and the trailing edge of the airfoil body; and
   a temperature probe extending axially through the airfoil body between the heater element and the trailing edge of the airfoil body, wherein the heater element is axially overlapped by the ice accretion feature to accrete ice chordwise forward of the tip surface;
   wherein the ice accretion feature includes a fin body extending from the leading edge to an ice accretion feature terminus that is located chordwise between the heater element and the temperature probe.

16. A sensor, comprising:
   an airfoil body defining a sensor axis and having a leading edge, a trailing edge, an ice accretion feature and a tip surface extending from the ice accretion feature to the trailing edge;
   a heater element extending axially through the airfoil body between the leading edge and the trailing edge of the airfoil body; and
   a temperature probe extending axially through the airfoil body between the heater element and the trailing edge of the airfoil body, wherein the heater element is axially overlapped by the ice accretion feature to accrete ice chordwise forward of the tip surface;
   wherein the airfoil body has a first face and a second face defining therebetween an airfoil width, and wherein the ice accretion feature has an ice accretion feature width that is greater than the airfoil width.

17. A gas turbine engine, comprising:
   a compressor section with a compressor inlet;
   a combustor section in fluid communication with the compressor section;
   a turbine section in fluid communication with the combustor section; and
   a sensor as recited in claim 1 supported within the compressor inlet of the compressor section.

\* \* \* \* \*